(12) United States Patent
Koski (10) Patent No.: US 6,836,386 B2
(45) Date of Patent: Dec. 28, 2004

(54) CALIBRATION OF TAPE DRIVE VELOCITY EMPLOYING DC MOTOR HALL SENSOR

(75) Inventor: John Alexander Koski, Livermore, CA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 10/241,510

(22) Filed: Sep. 12, 2002

(65) Prior Publication Data

US 2004/0051991 A1 Mar. 18, 2004

(51) Int. Cl.[7] .................................................. G11B 15/52
(52) U.S. Cl. ................................... 360/73.11; 360/71
(58) Field of Search ............................... 360/73.03, 71, 360/73.11; 318/254, 701, 800, 803; 242/331.3, 334.3; 702/58, 60, 145; 364/528.21; 324/772

(56) References Cited

U.S. PATENT DOCUMENTS

| | | | |
|---|---|---|---|
| 4,743,811 A | 5/1988 | Katayama | 318/7 |
| 5,134,349 A | 7/1992 | Kruse | 318/254 |
| 5,202,613 A | 4/1993 | Kruse | 318/254 |
| 5,321,342 A | 6/1994 | Kruse | 318/254 |
| 5,811,946 A | 9/1998 | Mullin et al. | 318/254 |
| 5,854,877 A | * 12/1998 | Lewis | 388/812 |
| 5,998,946 A | 12/1999 | Kim | 318/254 |
| 6,051,943 A | 4/2000 | Rabin et al. | 318/254 |
| 6,308,140 B1 | * 10/2001 | Dowling et al. | 702/60 |
| 6,449,567 B1 | * 9/2002 | Desai et al. | 702/58 |
| 6,760,176 B2 | * 7/2004 | Koski | 360/71 |

OTHER PUBLICATIONS

"Brushless DC motor drive circuit", Phillips Semiconductors—Product specification, TDA5144, Jun. 1994, pp. 2–18.
"Design Notes on Precision Phase Locked Speed Control for DC Motors", Unitrode Application Note U–113, pp3–132 thru 3–141.

* cited by examiner

Primary Examiner—Sinh Tran
Assistant Examiner—K. Wong
(74) Attorney, Agent, or Firm—John H. Holcombe (57) ABSTRACT

Calibration logic separately operates DC motors of a tape drive at a steady state estimated velocity (Omega C) for at least one full revolution without a tape; senses Hall sensor(s) to indicate a full revolution of each motor, measuring the time of the full revolution; determines the actual velocity (Omega A) of each motor employing the measured time; compares Omega C to Omega A to determine a calibration constant (K calib) for each motor; to calibrate the motor velocity of each motor, for determining the velocity for a mounted tape by averaging the tape velocity generated by each motor based on the calibrated motor velocity.

8 Claims, 5 Drawing Sheets

CALIBRATION OF TAPE DRIVE VELOCITY EMPLOYING DC MOTOR HALL SENSOR

FIELD OF THE INVENTION

This invention relates to tape drives, and, more particularly, to tape drives which employ DC motors, wherein the tape drive DC motors are arranged to longitudinally move a tape mounted on tape reels rotated by the DC motors under the control of a motor driver servo system.

BACKGROUND OF THE INVENTION

Tape, such as magnetic tape, provides a means for physically storing data which may be archived or which may be stored in storage shelves of automated data storage libraries, and accessed when required. As an archival medium, tape often comprises the only copy of the data, such that the data must be written accurately and the tape must be handled with care to prevent damage.

The servo system which moves the tape longitudinally is typically very precise, and the servo system bases the longitudinal movement on the instantaneous velocity of the tape.

Tape drives frequently employ DC motors and a motor driver servo system for operating the DC motors, to produce well controlled motion parameters such as position, velocity, and tape tension. Precise control of tape velocity is required in order to correctly read and/or write data to the tape. For such control, a primary velocity signal is generated, for example, employing a formatted servo track on the tape to directly measure the tape velocity. In the IBM LTO Ultrium Magnetic Tape Drive based on LTO (Linear Tape Open) technology, the servo track is made up of a sequence of repeated flux transitions, which produce a signal in a servo read head. The signal is a repeated set of bursts, that is peak detected to produce digital signals that can be used by logic to measure the time spacing between the bursts. The logic provides a count value of a reference oscillator to represent the time spacing of the bursts. This count value varies inversely with velocity, and is used to compute the velocity of the tape as it passes over the read head.

The primary velocity signal is a very accurate, and direct, measurement of tape velocity. However, the primary velocity signal is not always available for use in controlling the tape drive. During acceleration, deceleration, and while moving the read head between servo bands, the primary velocity signal is not available. There may also be exceptional conditions, such a loss of the servo signal, which make the primary velocity unavailable. The tape drive must be capable of controlling velocity indefinitely without the aid of the primary velocity signal. During such times, an alternate, or secondary velocity signal is required.

One example of a secondary velocity signal is the back-EMF voltage in DC motors. As is known to those of skill in the art, the back-EMF voltage can be computed by subtracting the estimated winding resistance ohmic voltage from the motor voltage. The winding resistance ohmic voltage is computed by multiplying the estimated motor current by the estimated winding resistance. The angular velocity of a DC motor is calculated by dividing the back EMF voltage of the motor by the motor voltage constant of the motor. A servo system computes an estimated longitudinal velocity of the tape by multiplying the motor angular velocity by the radius of the tape at the reel the motor is driving.

Other examples of secondary velocity comprise encoders or analog tachometers. It may be possible to compute a secondary velocity from the Hall sensors, if they have a good enough resolution, as an example, a DC motor with 72 Hall states per revolution.

The secondary velocity is typically always available, but does not have the accuracy of the primary velocity signal. For example, in the case of the back-EMF measurement, the velocity signal includes error sources, such as motor voltage constant tolerances, winding resistance tolerances and thermal effects, motor driver signal tolerances, and motor current estimation tolerances, among others.

SUMMARY OF THE INVENTION

In accordance with the present invention, a calibration system, logic, and a method are provided for calibrating the longitudinal velocity of tape in a tape drive.

In one embodiment, logic is provided for operating a tape drive. The tape drive has a plurality of DC motors, each arranged to longitudinally move a tape mounted on tape reels rotated by the DC motors under the control of a motor driver servo system, the motor driver servo system computing velocities of each of the DC motors for given longitudinal tape velocities, and the tape drive has at least one rotation index sensor, such as Hall sensor, at each of the DC motors for sensing full revolutions of the DC motors. The logic:

operates each of the DC motors under separate control at steady state computed estimated velocity (Omega C) for at least one full revolution without a tape;

senses rotation index sensor(s) to indicate a full revolution of each of the DC motors;

measures the time of the full revolution of each of the DC motors;

determines the actual velocity (Omega A) of each of the DC motors by dividing the measured time of the full revolution of each of the DC motors into 2 times pi;

determines a calibration constant (K calib) for each of the DC motors by comparing the computed estimated velocity (Omega C) during the full revolution, to the determined actual velocity (Omega A); and for the motor driver servo system, provides the calibration constants (K calib) for each of the DC motors for calibrating the motor velocity of each DC motor, whereby the motor driver servo system determines a longitudinal tape velocity for a tape mounted at the tape drive by averaging the tape velocity generated by each of the DC motors based on the calibrated motor velocity.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

As discussed above, the servo system which moves the tape longitudinally is typically very precise, and the servo system bases the longitudinal movement on the instantaneous velocity of the tape.

Figure 1:
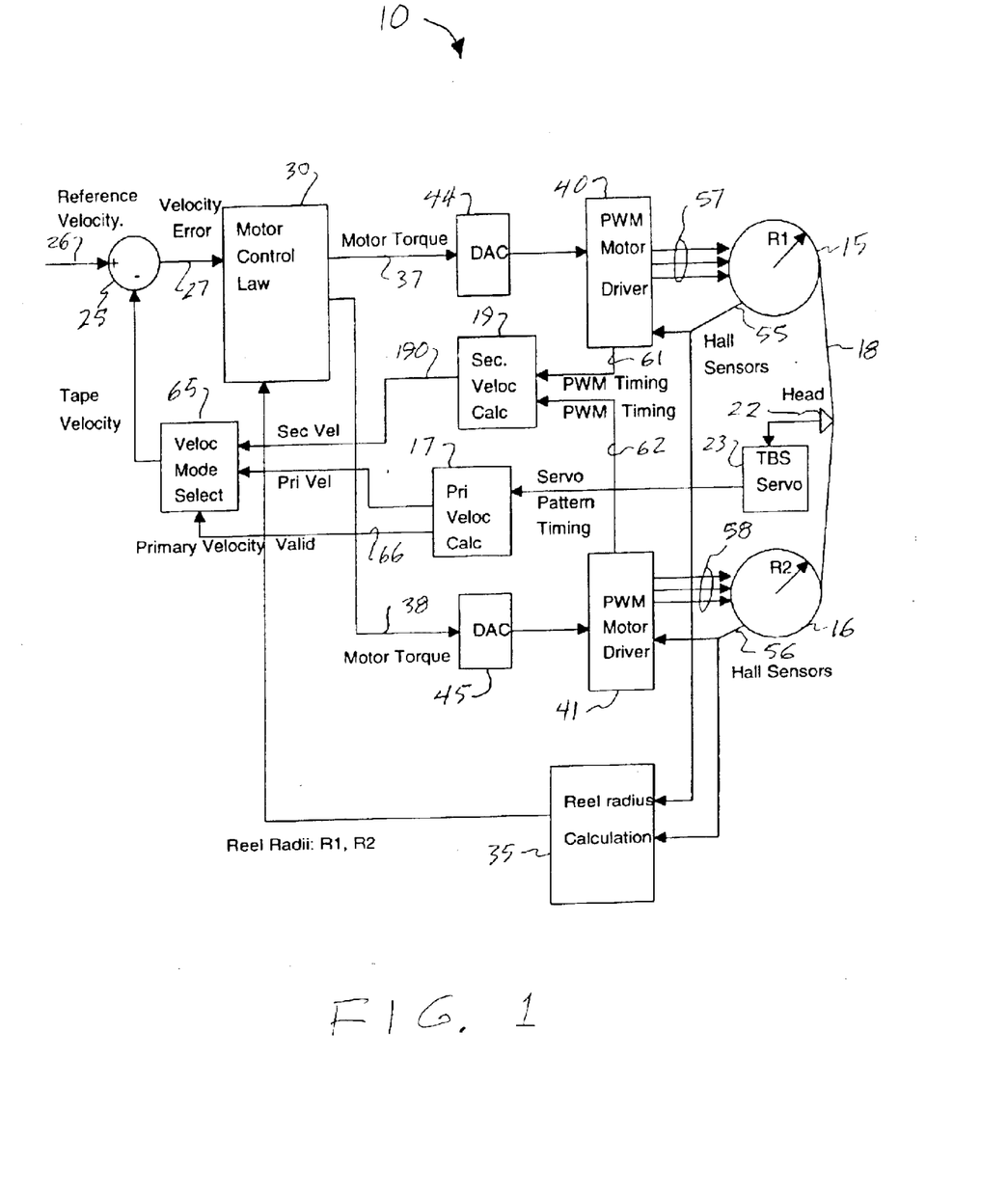
FIG. 1 is a block diagrammatic illustration of a tape drive which implements the present invention.

The tape drive 10 illustrated in FIG. 1 comprises a dual servo system for moving the tape longitudinally between reels driven by brushless DC motors 15 and 16. In the example of FIG. 1, a primary velocity signal is generated by logic 17 employing a formatted servo track on the tape 18 to directly measure the tape velocity, and a secondary velocity signal is derived by logic 19 from signals relating to the back-EMF of the DC motors 15 and 16.

An example of a directly sensed servo velocity is the IBM 3580 Ultrium magnetic tape drive based on LTO (Linear Tape Open) technology, where the servo track on the tape is made up of a sequence of repeated flux transitions, which produce a signal in a servo read head 22. The signal is a repeated set of bursts, that is peak detected to produce digital signals that can be used by logic 23 to measure the time spacing between the bursts. The logic provides a count value of a reference oscillator to represent the time spacing of the bursts. This count value varies inversely with velocity, and is used by logic 17 to compute the velocity of the tape as it passes over the read head.

The tape velocity is compared 25 to a reference tape velocity 26 to determine a velocity error 27. The velocity error is employed in logic 30, together with reel radii calculations from logic 35 to generate a motor torque signal 37, 38 for each DC motor.

The tape reels are driven by DC motors 15, 16, for example, comprising brushless DC motors. The DC motors are driven by PWM motor drivers 40, 41 with current-mode or transconductance amplifiers, as is known to those of skill in the art. The amplifiers have current sense circuits which produce a motor current signal that is subtracted from a reference current supplied by a DAC (digital to analog convertor) 44, 45. The difference between the current reference and the current sense produces an error current signal that is amplified and filtered in a compensator circuit that produces a motor control signal. This signal drives a pulse width modulator (PWM) which produces a digital signal that continually reverses the polarity of the voltage that is applied to the DC motor. The PWM signal is fed to a commutator circuit which is also controlled by commutation sensors (Hall sensors) 55, 56 that sense the motor armature position and select the proper motor winding that is to be excited by means of winding excitation lines 57, 58. The present technique is also applicable to brushed DC motors, if at least one Hall sensor is provided.

The servo and control system is a multiple input, multiple output (MIMO) system that computes two control values for the plant, which is made up of the two motors 15, 16, two tape reels, and the tape path connecting the two reels. This is so that the reels are rotated at the appropriate, usually different, rotational velocities, as determined by the reel radius calculation 35, such that the tape is moved from one tape reel having one diameter of tape, to another tape reel having another diameter of tape, at the same longitudinal velocity.

The MIMO control system computes the control values, in this case the required motor currents, to achieve the desired tape motion parameters. The computed motor currents are converted to analog voltages in digital to analog convertors (DACs) which drive the current mode amplifiers.

The primary velocity signal is a very accurate, and direct, measurement of tape velocity. However, the primary velocity signal is not always available for use in controlling the tape drive. During acceleration, deceleration, and while moving the read head between servo bands, the primary velocity signal is not available. There may also be exceptional conditions, such a loss of the servo signal, which make the primary velocity unavailable.

The tape drive must be capable of controlling velocity indefinitely without the aid of the primary velocity signal. During such times, an alternate, or secondary velocity signal is required.

The term "secondary velocity" refers to an estimate of the tape velocity when the primary velocity measurement is not available. One example of a secondary velocity signal is based on estimating the back-EMF voltage in DC motors from the motor excitation data, and the motor parameters, such as winding resistance, motor torque constant, etc., as is known to those of skill in the art.

The equation for the velocity of tape at a tape reel is:

$$Velocity = R*Omega,$$

where:

R=radius of the reel,

Omega=angular velocity of the reel.

The angular velocity of the reel is related to back-EMF of the DC motor that is driving the reel as follows:

$$Omega = Vb/Kb,$$

where:

Vb=motor back-EMF,

Kb=motor voltage constant.

The motor back-EMF cannot be directly measured, but it can be estimated from the motor excitation and the motor parameters. The estimate involves solving the equation:

$$Vb = Vm - Iwinding*Rwinding,$$

where:

Vm=applied motor voltage,

Iwinding=motor current,

Rwinding=motor winding resistance.

The motor current is known by the control system, since it solves for that value, and outputs it, through the DACs 44, 45, to the motor drivers. The winding resistance is known from the motor specifications, and the motor voltage is computed from the motor driver pulse width modulator (PWM) signal:

$$Vm = Vcc(2*PWMon\_time - PWMperiod)/PWM\ period,$$

where:

Vm=motor voltage,

Vcc=power supply voltage,

PWMon_time=the time duration when the PWM signal is in the positive binary state, PWMperiod=the time duration of one full PWM period.

The PWM timing is provided at lines 61, 62 to the secondary velocity calculation logic 19, and the information is employed to determine the secondary velocity.

Other examples of secondary velocity comprise encoders or analog tachometers. It may be possible to compute a secondary velocity from the Hall sensors, if they have a good enough resolution, as an example, a DC motor with 72 Hall states per revolution.

Velocity mode selection logic 65 selects the primary velocity 17 when it is available, for example, as indicated by line 66, and selects the estimated secondary velocity 19 when the primary velocity is not available.

The secondary velocity is typically always available, but does not have the accuracy of the primary velocity. For example, in the case of the back-EMF measurement, the velocity signal includes error sources, such as motor voltage constant tolerances, winding resistance tolerances and thermal effects, motor driver signal tolerances, and motor current estimation tolerances, among others.

The present invention calibrates the secondary velocity to improve the accuracy of the secondary velocity signal.

Figure 2:
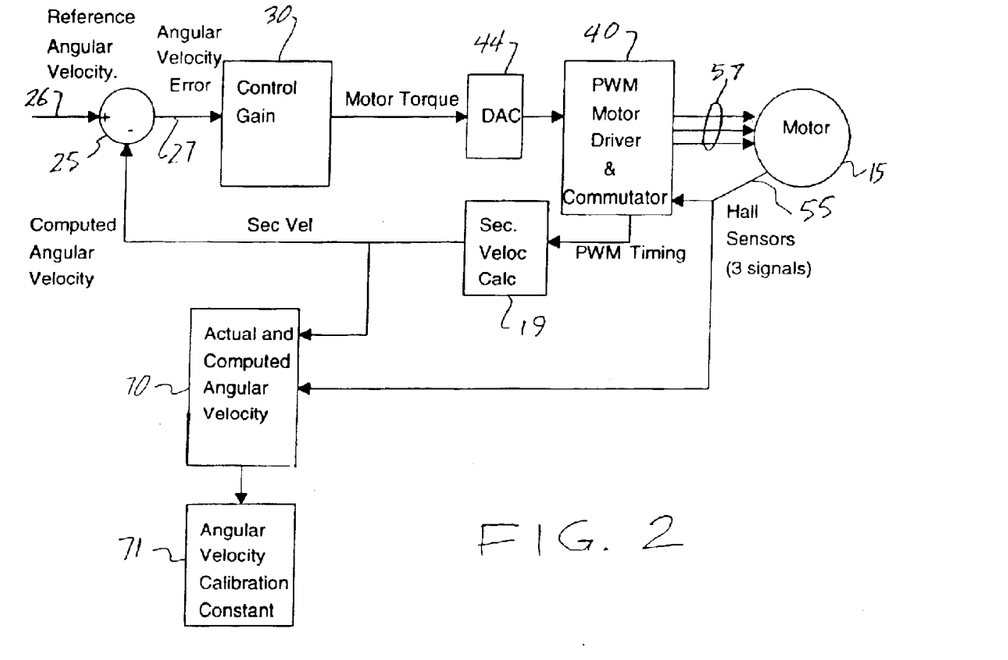
FIG. 2 is a block diagrammatic illustration of logic to determine a DC motor calibration of the tape drive of FIG. 1 in accordance with the present invention.

FIG. 2 illustrates an embodiment of logic to determine a secondary velocity calibration, showing one DC motor 15 of the tape drive 10 of FIG. 1. Logic 70 measures the computed estimated angular velocity (Omega C) of the DC motor 15, for example, from the secondary velocity signal 19, and determines the actual angular velocity (Omega A) of the DC motor 15, employing the Hall sensor(s) 55, and logic 71 determines a calibration constant (K calib) for the DC motor by comparing the computed estimated velocity (Omega C) to the determined actual velocity (Omega A).

Figure 3:
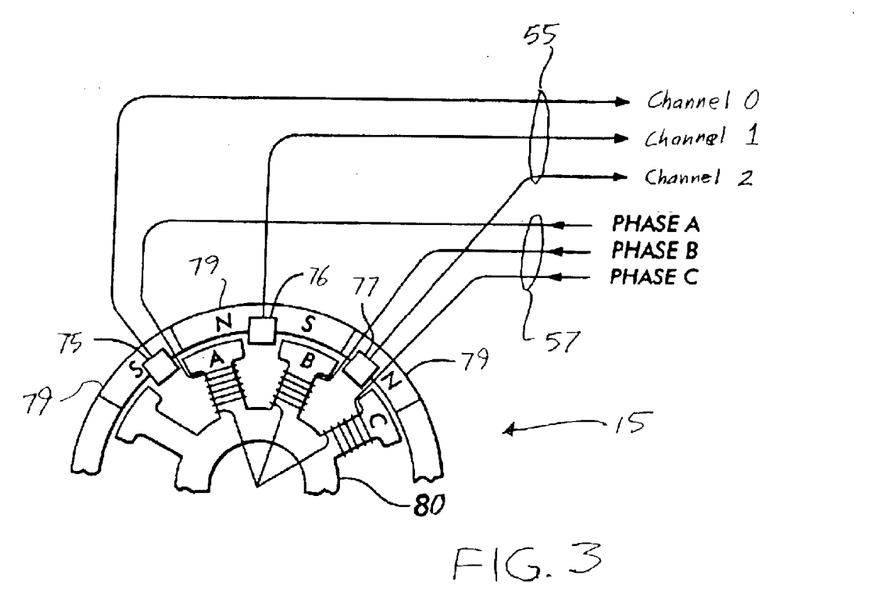
FIG. 3 is a schematic representation of an external rotor, three phase brushless DC motor and three Hall sensors.
Figure 4:
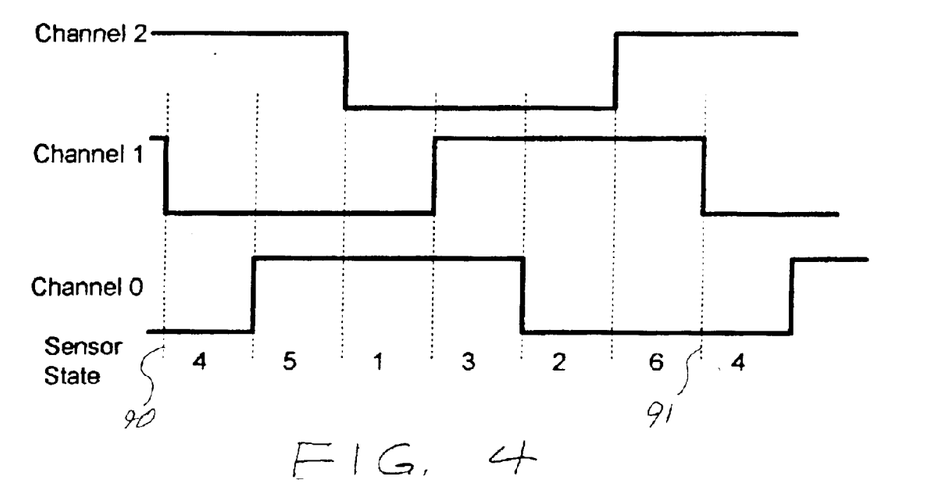
FIG. 4 is a diagrammatic illustration of Hall sensor signals for motion of the DC motor of FIG. 3.

FIG. 3 represents a a 3-phase external rotor brushless DC motor 15 and three Hall sensors 75, 76, 77. Referring additionally to FIG. 4, as is known to those of skill in the art, as the DC motor 15 is rotated, the Hall sensors proceed through a specific sequence of states, indicating feedback information about the rotor position as sensed from the rotor magnets 79. The feedback is provided on the Hall sensor channels 55 to the PWM motor driver 40 of FIG. 2, which commutates the motor control signals on winding excitation lines 57 of FIG. 3. The commutated drive signals drive windings on the stator 80, such that each control signal state (combination of drive signals on winding excitation lines 57) attracts the rotor magnets 79 to a specific stable physical position corresponding to that state. For example, if control state "A" were asserted and the rotor position permitted to stabilize, the rotor would reach a corresponding position "A".

Referring to FIGS. 3 and 4, the Hall sensors 75, 76, 77 are aligned so that the sensor signals change state precisely at the stable rotor positions.

For example, FIG. 4 illustrates the sequence of states for the three channels of the Hall sensors while the 3 phase brushless DC motor 15 of FIG. 3 is rotated in one direction, for example, the forward direction. The sequence of states of FIG. 4 for this direction of motion is 4, 5, 1, 3, 2, 6. During one full rotation of the motor, this sequence of states is repeated N times, where the number of magnetic poles of the rotor is 2N. The total number of Hall states for one full rotation of a 3 phase brushless DC motor with 8 magnetic poles in the rotor is therefore 24.

In accordance with an embodiment of the present invention, a full revolution of each of the DC motors is determined by counting the number of Hall states, N×6, where the number of poles is 2N. In the embodiment of FIGS. 3 and 4, a Hall state transition is selected, such as the transition to state 4. While the DC motor is rotating at a steady state velocity, the time is measured between one transition 90 to state 4 and the next transition 91 to state 4, which is a measurement of 1/N full revolutions of the DC motor. The time measurement is continued for N repetitions of the sequence from 90 to 91 to arrive at a precise measurement of the time for one full revolution of the DC motor.

Figure 5:
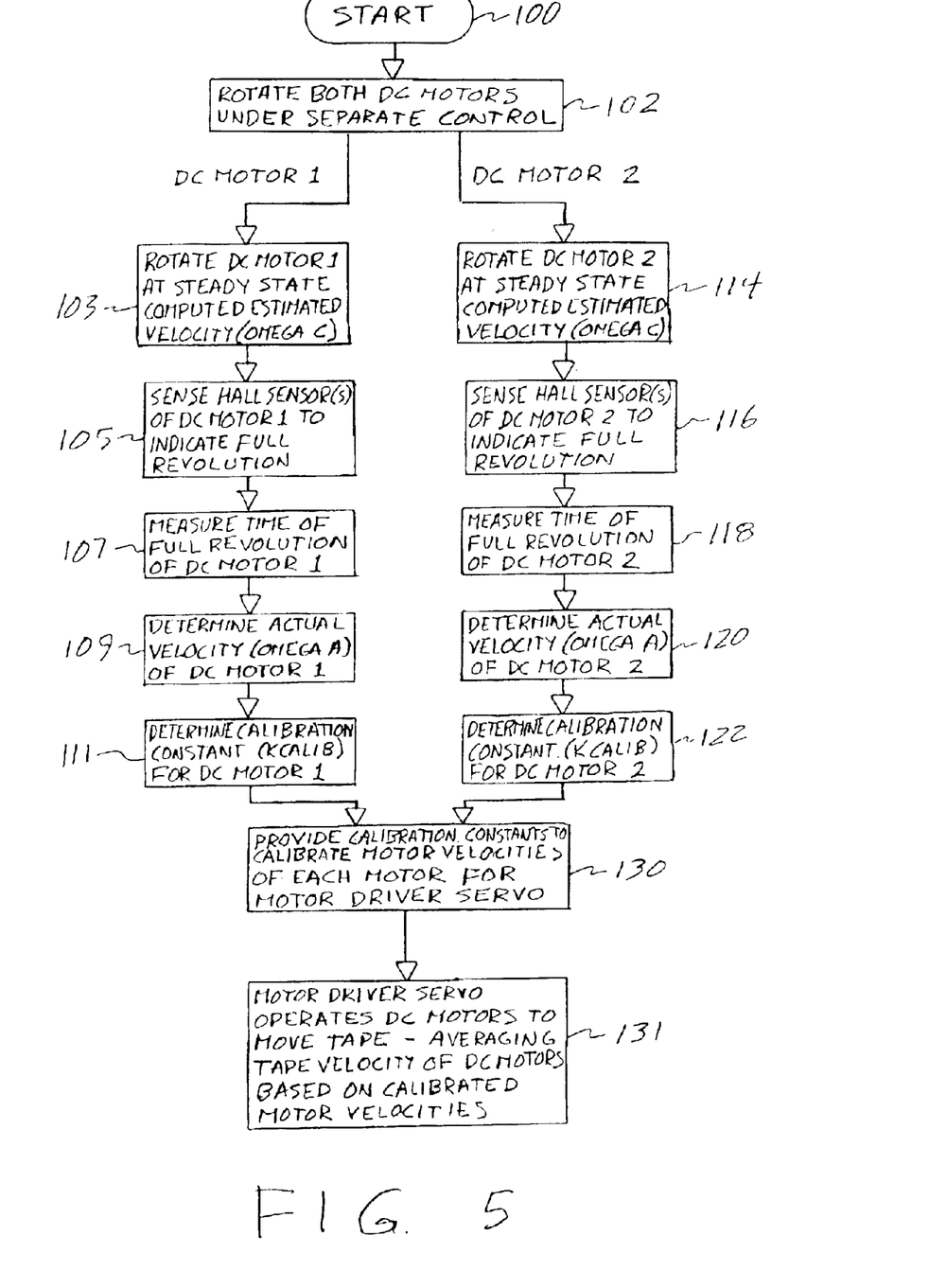
FIG. 5 is a flow chart depicting an embodiment of the method of the present invention for calibrating the longitudinal velocity of tape in the tape drive of FIG. 1.

An embodiment of the method of the present invention is provided by reference to FIG. 5.

When the tape drive servo system is inactive, such as when a tape is ejected from the tape drive, there is an opportunity to provide the calibration of the tape velocity by calibrating the angular velocities of the DC motors, beginning at step 100.

At step 102, each of the DC motors 15, 16 of FIG. 1 are rotated under separate control at steady state computed estimated velocity (Omega C) for at least one full revolution without a tape. Preferably, but not necessarily, the DC motors are rotated at the same time. The estimated velocity for each motor may be the same, and is provided by logic 30 under a special algorithm which allows the motors to be rotated without having tape mounted. Referring to FIG. 2, each DC motor, e.g., DC motor 15, is controlled for this process by a simple feedback system based on the angular velocity of each motor using the secondary velocity 19. This angular velocity signal is fed back and subtracted from a reference angular velocity signal 26 to provide an angular velocity error signal 27 that drives each motor independently.

Referring to FIG. 5, DC motor "1" will first be discussed. In step 103, DC motor "1" is rotated up to a constant reference, and rotated at a steady state computed estimated velocity (Omega C) for at least one full revolution without a tape. In step 105, while the DC motor "1" is rotating at the steady state speed, the Hall sensor(s), e.g., Hall sensors 75, 76, 77 of FIG. 3, are sensed to indicate a full revolution of the DC motor "1", e.g., as discussed above with respect to FIG. 4, and, in step 107 of FIG. 5, the time duration of the sensed one rotation of the DC motor is measured, e.g., by logic 70 of FIG. 2. For example, a clocked counter may make the measurement by counting the cycles of an oscillator that occur during the full revolution of the motor.

In step 109 of FIG. 5, logic 70 of FIG. 2 determines the actual velocity (Omega A) of the DC motor "1" in accordance with the formula:

$$\text{Omega A} = (2*pi)/(\text{rotation time for one revolution}).$$

Measuring the actual velocity based on the time of a full revolution of the motor provides an accurate, noise-free value for Omega A.

In step 111 of FIG. 5, the logic 71 of FIG. 2 collects the average value of the computed estimated velocity (Omega C) of DC motor "1", e.g., from the secondary value 19, for the same one full revolution during which the actual motor angular velocity (Omega A) is being measured. Measuring the average for a full revolution tends to provide a noise-free value of Omega C. Then, in step 111 of FIG. 5, the logic 71 of FIG. 2 determines a calibration constant (K calib) for DC motor "1" by comparing the computed estimated velocity (Omega C) during the full revolution, to the determined actual velocity (Omega A) of step 109 of FIG. 5.

In one embodiment, the calibration constant (K calib) is determined in accordance with the formula:

$$K\ calib = Omega\ A/Omega\ C,$$

where:

Omega A=actual angular velocity,

Omega C=computed estimated angular velocity.

The actual computation process may comprise a table lookup rather than division.

Thus, the accurate, noise-free value of Omega A is compared to a noise-free value of Omega C, and the values are synchronous in time, such-that the calibration constant improves the accuracy of the secondary velocity signal.

Referring to FIG. 5, the process is the same for DC motor "2". With each of the DC motors 15, 16 of FIG. 1 being rotated under separate control of step 102 without a tape, in step 114, DC motor "2" is rotated up to a constant reference, and rotated at a steady state computed estimated velocity (Omega C) for at least one full revolution without a tape. In step 116, while the DC motor "2" is rotating at the steady state speed, the Hall sensor(s), e.g., Hall sensors 75, 76, 77 of FIG. 3, are sensed to indicate a full revolution of the DC motor "2", e.g., as discussed above with respect to FIG. 4, and, in step 118 of FIG. 5, the time duration of the sensed one rotation of the DC motor is measured, e.g., by logic 70 of FIG. 2. For example, a counter may make the measurement by counting the cycles of an oscillator that occur during the full revolution of the motor.

In step 120 of FIG. 5, logic 70 of FIG. 2 determines the actual velocity (Omega A) of the DC motor "2" in accordance with the formula:

$$Omega\ A = (2*pi)/(\text{rotation time for one revolution}).$$

Again, measuring the actual velocity based on the time of a full revolution of the motor provides an accurate, noise-free value for Omega A.

In step 122 of FIG. 5, the logic 71 of FIG. 2 collects the average value of the computed estimated velocity (Omega C) of DC motor "2", e.g., from the secondary value 19, for the same one full revolution during which the actual motor angular velocity (Omega A) is being measured. Measuring the average for a full revolution tends to provide a noise-free value of Omega C. Then, in step 122 of FIG. 5, the logic 71 of FIG. 2 determines a calibration constant (K calib) for DC motor "2" by comparing the computed estimated velocity (Omega C) during the full revolution, to the determined actual velocity (Omega A) of step 120 of FIG. 5.

Again, in one embodiment, the calibration constant (K calib) is determined in accordance with the formula:

$$K\ calib = Omega\ A/Omega\ C,$$

where:

Omega A=actual angular velocity,

Omega C=computed estimated angular velocity.

The actual computation process may comprise a table lookup rather than division.

Thus, the accurate, noise-free value of Omega A is compared to a noise-free value of Omega C, and the values are synchronous in time, such that the calibration constant improves the accuracy of the secondary velocity signal.

In step 130 of FIG. 5, logic 71 of FIG. 2 for each of the DC motors "1" and "2" provides the calibration constants (K calib) for each of the DC motors to the secondary velocity logic 19 of FIG. 1 for calibrating the motor velocity for each of the DC motors. Thereby, the motor driver servo system, in step 131 of FIG. 5, determines a longitudinal tape velocity 190 of FIG. 1 for a tape mounted at the tape drive 10 by averaging the tape velocity generated by each of the DC motors based on the calibrated motor velocity (K calib) for that motor.

Figure 6:
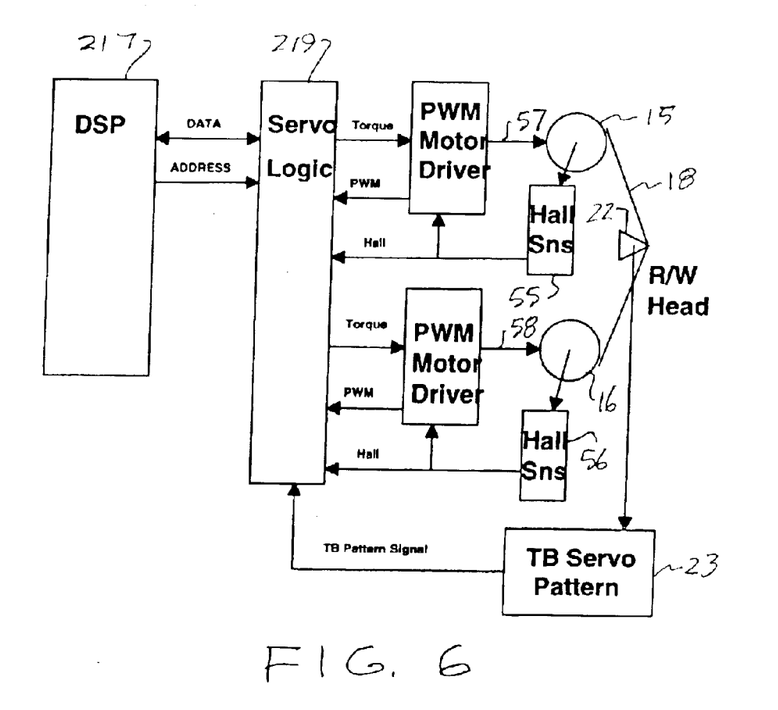
FIG. 6 is a block diagrammatic illustration of a motor driver servo system of FIG. 1.

An advantage of the present invention is that it is essentially cost free, employing existing components of the tape drive. Referring to FIG. 6, the present invention utilizes the same hardware that is already available for the tape drive servo control system which operates DC motors 15, 16 to move a tape along the tape path 18, past at least one read/write head 22 which is positioned at the tape path for reading and/or writing data with respect to the magnetic tape. A digital signal processor or microprocessor controller 217 comprise the logic with a servo system 23, 219 for operating DC motors 15, 16 by means of a motor control system 20, 21 to rotate the reels at velocities and with accelerations that allow the tape to be moved at desired longitudinal speeds as the tape is unwound from one tape reel and wound onto the other tape reel, while maintaining desired tension on the tape. A primary velocity signal may be derived from a servo track or tracks recorded on the tape and read by the read/write head 22 and decoded by a servo decoder 23, as discussed above. The tape reels are driven by DC motors 15, 16, which are driven by PWM motor driver control systems 220, 221 in which PWM signals are fed to commutator circuits controlled by commutation sensors (Hall sensors) 55, 56 that sense the motor armature position and select the proper motor winding that is to be excited.

The computed estimated angular velocity (Omega C) is provided by the same process that is used to control the tape drive during normal servo operation while moving tape, and the actual angular velocity (Omega A) is provided by the same Hall sensors that are employed to control the commutation of the drive signals to the DC motors. The logic is implemented in the same servo logic 219 and/or digital signal processor 217, and occurs during a time when the digital signal processor and servo logic are free of other tasks, such as after unloading and ejecting a tape, or immediately after power-on of the machine. The present invention therefore does not utilize processor power that would otherwise be needed for data flow or control system tasks.

Figure 7:
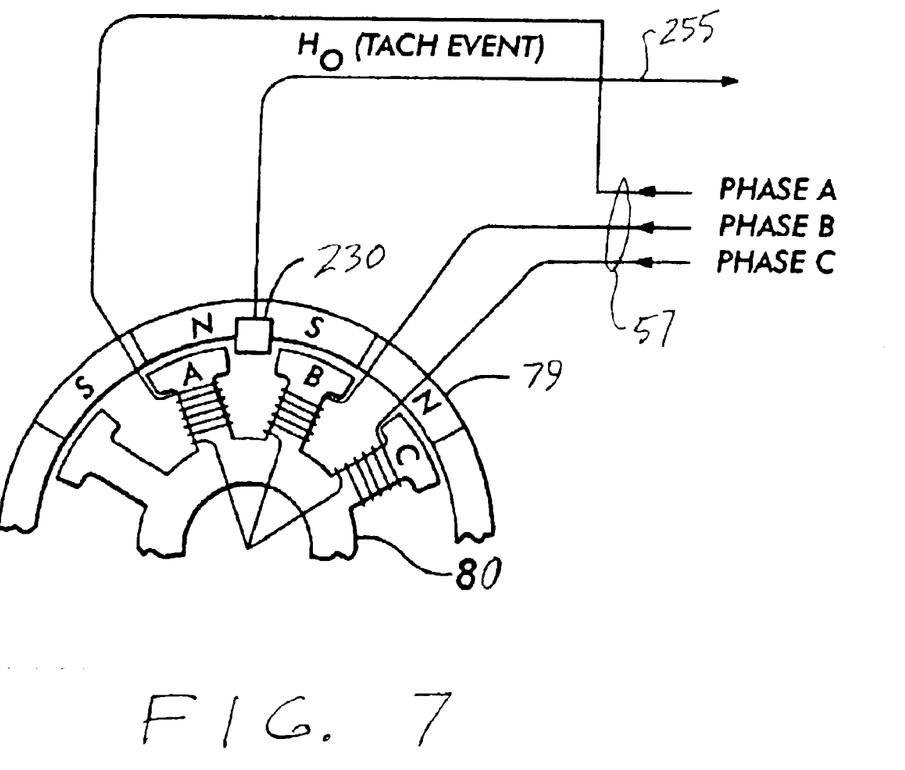
FIG. 7 is a schematic representation of a DC motor and a single Hall sensor.

FIG. 7 illustrates an alternative embodiment of Hall sensors, in which a single Hall sensor 220 is employed to commutate the DC motor. The arrangement is discussed in U.S. Pat. No. 6,051,943, issued Apr. 18, 2000, and also employs a tach counter, such that, as the DC motor is rotated, the Hall sensor and tach counter proceed through a specific sequence of states, indicating feedback information about the rotor position as sensed from the rotor magnets 79. As before, commutated drive signals are provided at drive windings on the stator 80, such that each control signal state (combination of drive signals on winding excitation lines 57) attracts the rotor magnets 79 to a specific stable physical position corresponding to that state. The present invention thus employs a "tach event" occurring on line 255 to indicate the beginning and ending of the full revolution.

As another alternative, more than one full revolution may be employed, the resultant counts being divided by the number of full revolutions to provide the equivalent of a measured time of a single full revolution.

Furthermore, this calibration method is extendable to brushed DC motors, and to brushless DC motors with arbitrary number of magnetic poles and arbitrary number of phases.

While the preferred embodiments of the present invention have been illustrated in detail, it should be apparent that modifications and adaptations to those embodiments may occur to one skilled in the art without departing from the scope of the present invention as set forth in the following claims.

I claim:

1. A tape velocity calibration system for a tape drive, said tape drive having a plurality of DC motors, said DC motors each arranged to longitudinally move a tape mounted on tape reels rotated by said DC motors under the control of a motor driver servo system, said motor driver servo system computing velocities of each of said DC motors for given longitudinal tape velocities; said velocity calibration system comprising:

at least one Hall sensor at each of said DC motors for sensing the states of said DC motors; and logic for operating said DC motors, said logic:
operating each of said DC motors under separate control at steady state computed estimated velocity (Omega C) for at least one full revolution without a tape;
sensing said at least one Hall sensor to indicate a full revolution of each of said DC motors;
measuring the time of said full revolution of each of said DC motors;
determining the actual velocity (Omega A) of each of said DC motors by dividing said measured time of said full revolution of each of said DC motors into 2 times pi;
determining a calibration constant (K calib) for each of said DC motors by comparing said computed estimated velocity (Omega C) during said full revolution, to said determined actual velocity (Omega A); and
for said motor driver servo system, providing said calibration constants (K calib) for each of said DC motors for calibrating the motor velocity of each said DC motor, whereby said motor driver servo system determines a longitudinal tape velocity for a tape mounted at said tape drive by averaging the tape velocity generated by each of said DC motors based on said calibrated motor velocity.

2. The tape velocity calibration system of claim 1, comprising three said Hall sensors for each said DC motor; and wherein said logic senses the pattern generated by said three Hall sensors to indicate said full revolution of each of said DC motors.

3. Logic for operating a tape drive, said tape drive having a plurality of DC motors, said DC motors each arranged to longitudinally move a tape mounted on tape reels rotated by said DC motors, at least one Hall sensor at each of said DC motors for sensing the states of said DC motors, and a motor driver servo system, said logic for operating said motor driver servo system, said motor driver servo system computing velocities of each of said DC motors for given longitudinal tape velocities, and said logic detecting said Hall sensors, said logic:

operating each of said DC motors under separate control at steady state computed estimated velocity (Omega C) for at least one full revolution without a tape;
sensing said at least one Hall sensor to indicate a full revolution of each of said DC motors;
measuring the time of said full revolution of each of said DC motors;
determining the actual velocity (Omega A) of each of said DC motors by dividing said measured time of said full revolution of each of said DC motors into 2 times pi;
determining a calibration constant (K calib) for each of said DC motors by comparing said computed estimated velocity (Omega C) during said full revolution, to said determined actual velocity (Omega A); and
for said motor driver servo system, providing said calibration constants (K calib) for each of said DC motors for calibrating the motor velocity of each said DC motor, whereby said motor driver servo system determines a longitudinal tape velocity for a tape mounted at said tape drive by averaging the tape velocity generated by each of said DC motors based on said calibrated motor velocity.

4. The logic of claim 3, wherein said DC motors comprise three said Hall sensors for each said DC motor; and wherein said logic senses the pattern generated by said three Hall sensors to indicate said full revolution of each of said DC motors.

5. A magnetic tape drive for reading and/or writing data with respect to magnetic tape, comprising:

at least one read/write head positioned at a tape path for reading and/or writing data with respect to a magnetic tape in said tape path;

a plurality of DC motors, each arranged to longitudinally move a tape mounted on tape reels rotated by said DC motors;

at least one Hall sensor at each of said DC motors for sensing the states of said DC motors;

a motor driver servo system, said motor driver servo system computing velocities of each of said DC motors for given longitudinal tape velocities; and logic for operating said motor driver servo system, and detecting said Hall sensors, said logic:
operating each of said DC motors under separate control at steady state computed estimated velocity (Omega C) for at least one full revolution without a tape;
sensing said at least one Hall sensor to indicate a full revolution of each of said DC motors;
measuring the time of said full revolution of each of said DC motors;
determining the actual velocity (Omega A) of each of said DC motors by dividing said measured time of said full revolution of each of said DC motors into 2 times pi;
determining a calibration constant (K calib) for each of said DC motors by comparing said computed estimated velocity (Omega C) during said full revolution, to said determined actual velocity (Omega A); and
for said motor driver servo system, providing said calibration constants (K calib) for each of said DC motors for calibrating the motor velocity of each said DC motor, whereby said motor driver servo system determines a longitudinal tape velocity for a tape mounted at said tape drive by averaging the tape velocity generated by each of said DC motors based on said calibrated motor velocity.

6. The magnetic tape drive of claim 5, comprising three said Hall sensors for each said DC motor; and wherein said logic senses the pattern generated by said three Hall sensors to indicate said full revolution of each of said DC motors.

7. A method for calibrating tape velocity for a tape drive, said tape drive having a plurality of DC motors, said DC motors each arranged to longitudinally move a tape mounted on tape reels rotated by said DC motors under the control of a motor driver servo system, said motor driver servo system computing velocities of each of said DC motors for given longitudinal tape velocities; and at least one Hall sensor at each of said DC motors for sensing the states of said DC motors; said method comprising the steps of:

operating each of said DC motors under separate control at steady state computed estimated velocity (Omega C) for at least one full revolution without a tape;

sensing said at least one Hall sensor to indicate a full revolution of each of said DC motors;

measuring the time of said full revolution of each of said DC motors;

determining the actual velocity (Omega A) of each of said DC motors by dividing said measured time of said full revolution of each of said DC motors into 2 times pi;

determining a calibration constant (K calib) for each of said DC motors by comparing said computed estimated velocity (Omega C) during said full revolution, to said determined actual velocity (omega A); and for said motor driver servo system, providing said calibration constants (K calib) for each of said DC motors for calibrating the motor velocity of each said DC motor, whereby said motor driver servo system determines a longitudinal tape velocity for a tape mounted at said tape drive by averaging the tape velocity generated by each of said DC motors based on said calibrated motor velocity.

8. The method of claim 7, wherein said tape drive comprises three said Hall sensors for each said DC motor; and wherein said step of sensing said at least one Hall sensor comprises sensing the pattern generated by said three Hall sensors to indicate said full revolution of each of said DC motors.

* * * * *